(12) United States Patent
Kwak et al.

(10) Patent No.: US 7,732,004 B2
(45) Date of Patent: Jun. 8, 2010

(54) DISPENSER FOR LIQUID CRYSTAL DISPLAY PANEL AND DISPENSING METHOD USING THE SAME

(75) Inventors: Soo-Min Kwak, Gyeongsangbuk-Do (KR); Hae-Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 1205 days.

(21) Appl. No.: 10/992,213

(22) Filed: Nov. 19, 2004

(65) Prior Publication Data

US 2005/0133108 A1 Jun. 23, 2005

(30) Foreign Application Priority Data

Nov. 25, 2003 (KR) .................. 10-2003-0084164

(51) Int. Cl.
*B05D 5/06* (2006.01)
*B05D 1/02* (2006.01)
*B05D 3/00* (2006.01)

(52) U.S. Cl. .............. 427/58; 427/424; 427/427.3; 118/315; 118/323

(58) Field of Classification Search .......... 118/315, 118/323; 427/424, 427.3, 58
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shiizu et al. | |
| 5,742,370 A | 4/1998 | Kim | |
| 5,757,451 A | 5/1998 | Miyazaki | |
| 5,852,484 A | 12/1998 | Inoue et al. | |
| 5,854,664 A | 12/1998 | Inoue et al. | |

(Continued)

FOREIGN PATENT DOCUMENTS

EP  1 003 066 A1  5/2000

(Continued)

*Primary Examiner*—Timothy H Meeks
*Assistant Examiner*—Jimmy Lin
(74) *Attorney, Agent, or Firm*—McKenna Long & Aldridge LLP

(57) ABSTRACT

A dispenser for a liquid crystal display panel includes a table for loading a substrate having at least one image display unit and being horizontally driven in a driving direction of a long side or a short side of the substrate, at least one support member to be horizontally driven in a driving direction perpendicular to the driving direction of the table, and at least one syringe aligned on the support member to supply a dispensing material to the substrate.

5 Claims, 8 Drawing Sheets

U.S. PATENT DOCUMENTS

| | | | |
|---|---|---|---|
| 5,861,932 A | 1/1999 | Inata | |
| 5,875,922 A | 3/1999 | Chastine et al. | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 2001/0013920 A1* | 8/2001 | Hashimoto et al. | 349/187 |
| 2002/0009536 A1* | 1/2002 | Iguchi et al. | 427/10 |
| 2003/0181124 A1* | 9/2003 | Lee et al. | 445/25 |
| 2003/0190419 A1* | 10/2003 | Katagami et al. | 427/240 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-55625 * | 3/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 02-198417 | 8/1990 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 8313918 | 11/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-052320 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |

| | | | | | |
|---|---|---|---|---|---|
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-258299 | 8/2002 |
| JP | 2001-215459 | 8/2001 | JP | 2002-236292 | 9/2002 |
| JP | 2001-222017 | 8/2001 | JP | 2002-277865 | 9/2002 |
| JP | 2001-235758 | 8/2001 | JP | 2002-277866 | 9/2002 |
| JP | 2001-255542 | 9/2001 | JP | 2002-277881 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-323687 | 11/2002 |
| JP | 2001-330837 | 11/2001 | JP | 2002-323694 | 11/2002 |
| JP | 2001-330840 | 11/2001 | JP | 2002-333628 | 11/2002 |
| JP | 2001-356353 | 12/2001 | JP | 2002-333635 | 11/2002 |
| JP | 2001-356354 | 12/2001 | JP | 2002-333843 | 11/2002 |
| JP | 2002-014360 | 1/2002 | JP | 2002-341329 | 11/2002 |
| JP | 2002-023176 | 1/2002 | JP | 2002-341355 | 11/2002 |
| JP | 2002-049045 | 2/2002 | JP | 2002-341356 | 11/2002 |
| JP | 2002-079160 | 3/2002 | JP | 2002-341357 | 11/2002 |
| JP | 2002-080321 | 3/2002 | JP | 2002-341358 | 11/2002 |
| JP | 2002-082340 | 3/2002 | JP | 2002-341359 | 11/2002 |
| JP | 2002-090759 | 3/2002 | JP | 2002-341362 | 11/2002 |
| JP | 2002-090760 | 3/2002 | JP | 2003-005194 | 1/2003 |
| JP | 2002-107740 | 4/2002 | JP | 2003-084291 | 3/2003 |
| JP | 2002-122870 | 4/2002 | JP | 2003-295201 | 10/2003 |
| JP | 2002-122872 | 4/2002 | JP | 2003-315757 | 11/2003 |
| JP | 2002-122873 | 4/2002 | KR | 2000-0035302 | 6/2000 |
| JP | 2002-131762 | 5/2002 | | | |

\* cited by examiner

DISPENSER FOR LIQUID CRYSTAL DISPLAY PANEL AND DISPENSING METHOD USING THE SAME

The present invention claims the benefit of Korean Patent Application No. 2003-84164 filed in Korea on Nov. 25, 2003, which is hereby incorporated by reference.

BACKGROUND OF THE INVENTION

1. Field of the Invention

The present invention relates to a liquid crystal display (LCD) panel, and more particularly to, a dispenser for an LCD panel and a dispensing method using the same. Although the present invention is suitable for a wide scope of applications, it is particularly suitable for reducing a time taken to form seal patterns on a plurality of liquid crystal display panels formed on a large size mother substrate, and forming seal patterns on small-sized LCD panels formed on a large size mother substrate.

2. Discussion of the Related Art

In general, an LCD device is a display device for displaying an image by controlling light transmittance of pixels arranged in a matrix shape and then individually supplying data signals based on image information to the pixels. Therefore, the LCD device includes an LCD panel on which the pixels are arranged in the matrix shape, a gate driving unit, and a data driving unit for driving the pixels.

The LCD panel includes a color filter substrate and a thin film transistor array substrate attached with a predetermined cell-gap, and a liquid crystal layer formed at the cell-gap between the color filter substrate and the thin film transistor array substrate. A plurality of data lines for transmitting data signals from the data driving unit to the pixels, and a plurality of gate lines for transmitting scan signals from the gate driving unit to the pixels are orthogonal to each other on the LCD panel. The pixels are defined in each of the intersections of the data lines and the gate lines. Thin film transistors for switching the data signals transmitted from the data driving unit through the data lines, and pixel electrodes for receiving the data signals through the thin film transistors are individually formed in the pixels. The gate driving unit sequentially supplies the scan signals to the plurality of gate lines, thereby sequentially selecting one line of the pixels arranged in the matrix shape. The data driving unit supplies the data signals to the selected pixels.

Common electrodes and pixel electrodes are formed on the LCD panel on which the color filter substrate and the thin film transistor array substrate are attached, for applying an electric field to the liquid crystal layer. When a voltage is applied to the common electrodes, if a voltage of the data signals applied to the pixel electrodes is controlled, the liquid crystals of the liquid crystal layer are rotated due to dielectric anisotropy by the electric field between the common electrodes and the pixel electrodes, for transmitting or intercepting light in each pixel to display characters or images.

A related art LCD device will now be explained in detail with reference to FIG. 1. FIG. 1 is a schematic plane diagram illustrating a unit LCD panel on which a thin film transistor array substrate and a color filter substrate are attached to face each other in the related art LCD device.

Referring to FIG. 1, the LCD panel 100 includes an image display unit 113 on which liquid crystal cells are arranged in a matrix shape, a gate pad unit 114 connected to gate lines of the image display unit 113, and a data pad unit 115 connected to data lines of the image display unit 113. The image display unit 113 includes a thin film transistor array substrate 113 and a color filter substrate 102. Herein, the gate pad unit 114 and the data pad unit 115 are formed at the edges of the thin film transistor array substrate 101 that does not overlap the color filter substrate 102. The gate pad unit 114 supplies scan signals from a gate driver integration circuit to the gate lines, and the data pad unit 115 supplies image information from a data driver integration circuit to the data lines. In addition, the data lines receiving the image information and the gate lines receiving the scan signals are arranged on the thin film transistor array substrate 101 to vertically cross each other. Thin film transistors for switching the liquid crystal cells, and pixel electrodes connected to the thin film transistors for driving the liquid crystal cells are formed in the intersections of the data lines and the gate lines, respectively. A protecting film is formed on the entire surface to protect the electrodes and the thin film transistors.

Color filters separated by cell regions by a black matrix and common transparent electrodes are formed on the color filter substrate 102. The common transparent electrodes are counter electrodes to the pixel electrodes formed on the thin film transistor array substrate 101. A cell-gap is formed between the thin film transistor array substrate 101 and the color filter substrate 102 to isolate the two substrates from each other by spacers. The thin film transistor array substrate 101 and the color filter substrate 102 are attached by a seal pattern 116 formed at a peripheral region of the image display unit 113, thereby forming the unit LCD panel.

A method for simultaneously forming a plurality of unit LCD panels on a large size mother substrate has been generally employed to improve yield of the LCD panels. A process is required to separate the unit LCD panels from the large size mother substrate by cutting and polishing the mother substrate. A liquid crystal layer may be formed at the cell-gap by injecting a liquid crystal material into the unit LCD panel via a liquid crystal injection hole, and then the liquid crystal injection hole is sealed up. Accordingly, the unit LCD panels are fabricated by the processes for individually fabricating the thin film transistor array substrate 101 and the color filter substrate 102, soldiering the thin film transistor array substrate 101 and the color filter substrate 102 with a predetermined cell-gap, cutting the attached structure into the unit LCD panels, and injecting liquid crystal into the unit LCD panels.

Especially, a process for forming the seal pattern 116 at the peripheral region of the image display unit 113 is required so that the thin film transistor array substrate 101 and the color filter substrate 102 can be bonded together. A related art method for forming seal patterns will now be explained with reference to FIGS. 2A and 2B. FIGS. 2A and 2B are exemplary diagrams illustrating a screen printing method for forming the seal patterns.

As illustrated in FIGS. 2A and 2B, the screen printing method requires a screen mask 206 patterned to selectively expose formation regions of a plurality of seal patterns 216A-216F, and a squeegee 208 for simultaneously forming the plurality of seal patterns 216A-216F by selectively supplying a sealant 203 to a substrate 200 through the screen mask 206. The plurality of seal patterns 216A-216F formed on the substrate 200 generate gaps for forming liquid crystal layers and prevent the liquid crystal material from leaking out of image display units 213A-213F. Accordingly, the plurality of seal patterns 216A-216F are formed at the peripheral regions of the image display units 213A-213F of the substrate 200 with liquid crystal injection holes 204A-204F at their one-side portions.

As shown in FIG. 2B, the screen printing method includes a formation step for forming the plurality of seal patterns 216A-216F on the substrate 200 by coating the sealant 203 on the screen mask 206 patterned with the formation regions of the plurality of seal patterns 216A-216F, and printing the coated sealant 203 by using the squeegee 208, and a drying step for leveling the resulting structure by evaporating solvents contained in the plurality of seal patterns 216A-216F.

Although the screen printing method has been generally employed because it has the simple processes, the screen printing method forms the plurality of seal patterns 216A-216F at the same time by coating the sealant 203 on the whole surface of the screen mask 206 and printing the coated sealant 203 by using the squeegee 208, thereby increasing the consumption amount of the sealant 203. Moreover, since the screen mask 206 contacts the substrate 200, rubbing defects occur on an orientation film (not shown) formed on the substrate 200, thereby reducing image quality of the LCD device.

A seal dispensing method has been proposed to solve the above problems of the screen printing method. FIG. 3 is an exemplary diagram illustrating the seal dispensing method for forming seal patterns. As shown in FIG. 3, a plurality of seal patterns 316A-316F are formed at peripheral regions of image display units 313A-313F on a substrate 300, such that a table 310 on which the substrate 300 is loaded is transferred in the long side and short side directions of the substrate 300, and a predetermined pressure is applied to a plurality of syringes 301A-301C fixedly aligned on a support member 314 to discharge a sealant. Herein, the seal patterns 316A-316F are sequentially formed in row units of the image display units 313A-313F.

The seal dispensing method selectively supplies the sealant to the formation regions of the seal patterns 316A-316F, thereby reducing the consumption amount of the sealant. Since the syringes 301A-301C do not contact the image display units 313A-313F, rubbing defects do not occur on an orientation film (not shown), thereby improving the image quality of the LCD device.

The seal dispensing method forms the seal patterns 316A-316F at the peripheral regions of the image display units 313A-313F of the substrate 300, by fixing the support member 314 on which the syringes 301A-301C are fixedly aligned, horizontally transferring the table 310 in the long side and short side directions of the substrate 300, and applying a predetermined pressure to the syringes 301A-301C filled with the sealant. However, a related art dispenser for an LCD panel for forming seal patterns and a dispensing method using the same have the following disadvantages.

First, since a size of an LCD panel increases, a size of a substrate for forming the large size LCD panel also increases. When a table is horizontally transferred in the long side and short side directions of the large size substrate to form seal patterns on the substrate, a driving space of the table must be increased twice in the long side and short side directions of the substrate. Therefore, if the area of the substrate increases twice, the space of the dispenser must be increased four times to obtain the driving space of the table, thereby reducing clean-room using efficiency.

Second, since the table on which the large size substrate is loaded is horizontally transferred in the long side and short side directions of the substrate, an extended period of time is taken to form the seal patterns, thereby resulting in low productivity.

Third, the related art dispenser for the LCD panel and the dispensing method using the same cannot form seal patterns on small-sized LCD panels. That is, in the case of the small-sized LCD panels, seal patterns cannot be formed at peripheral regions of image display units due to interferences between neighboring syringes.

SUMMARY OF THE INVENTION

Accordingly, the present invention is directed to a dispenser for an LCD panel and dispensing method using the same that substantially obviate one or more of the problems due to limitations and disadvantages of the related art.

An object of the present invention is to provide a dispenser for an LCD panel which is able to reduce a time for forming seal patterns on a plurality of LCD panels on a large size mother substrate, and a dispensing method using the same.

Another object of the present invention is to provide a dispenser for an LCD panel which is able to form seal patterns on small-sized LCD panels on a large size mother substrate, and a dispensing method using the same.

Yet another object of the present invention is to provide a dispenser for an LCD panel that is capable of improving clean-room using efficiency and productivity, and a dispensing method using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the dispenser for an LCD panel includes a table for loading a substrate having at least one image display unit and being horizontally driven in a driving direction of a long side or a short side of the substrate, at least one support member to be horizontally driven in a driving direction perpendicular to the driving direction of the table, and at least one syringe aligned on the support member to supply a dispensing material to the substrate.

In another aspect, the dispensing method for an LCD panel includes aligning at least one syringe on at least one support member, loading a substrate on a table, the substrate having at least one image display units, horizontally driving the table in a driving direction of a long side or a short side of the substrate, and supplying a dispensing material to the substrate via the syringes, and horizontally driving the support members in a driving direction perpendicular to the driving direction of the table, and supplying the dispensing material to the substrate via the syringes.

In another aspect, the dispensing method for an LCD panel includes aligning a plurality of syringes on at least one support member, loading a substrate, on which a plurality of image display units are formed, on a table, forming a first region of seal patterns at peripheral regions of even numbered image display units, by horizontally driving the table in a first direction and supplying a dispensing material to the substrate via a first group of the syringes, forming a second region of the seal patterns at the peripheral regions of the even numbered image display units, by horizontally driving the at least one support member in a second direction and supplying the dispensing material to the substrate via the first group of syringes, forming a third region of seal patterns at peripheral regions of odd numbered image display units, by horizontally driving the table in a third and supplying the dispensing material to the substrate via a second group of syringes, and forming a fourth region of the seal patterns at the peripheral regions of the odd numbered image display units, by horizontally driving the at least one support member in a fourth and supplying the dispensing material to the substrate via the second group of syringes.

In another aspect, the dispenser for an LCD panel includes a table for loading a substrate having a plurality of image display units and being horizontally driven in a first direction and a third direction, a plurality of support members to be horizontally driven in a second direction and a fourth, and a plurality of syringes on the plurality of support member and dividing into at least a first group and a second group for supplying a dispensing material on the substrate, wherein the first group of syringes supply the dispensing material at peripheral regions of even numbered image display units by horizontally driving the table in the first direction and horizontally driving the support members in the second direction, and the second group of syringes supply the dispensing material at peripheral regions of odd numbered image display units by horizontally driving the table in the third direction and horizontally driving the support members in the fourth direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
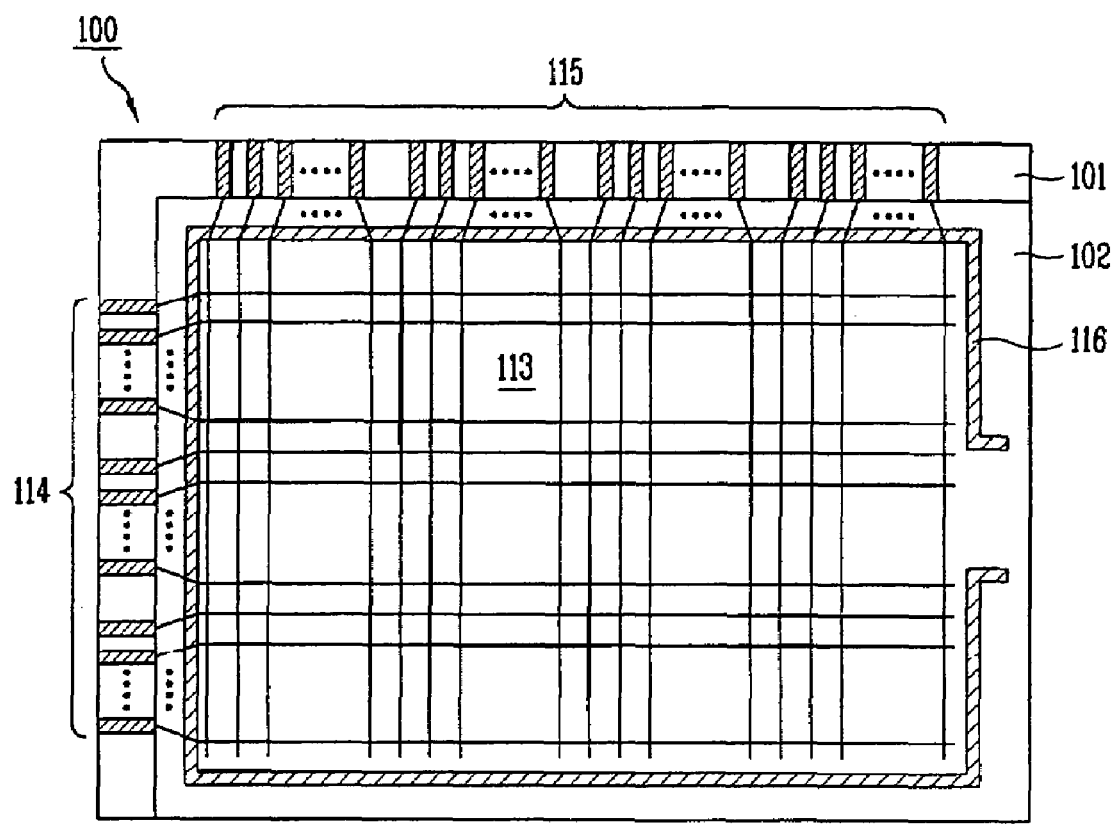
FIG. 1 is a schematic plane diagram illustrating a unit LCD panel on which a thin film transistor array substrate and a color filter substrate are attached to face each other in a related art LCD device.
Figure 2A:
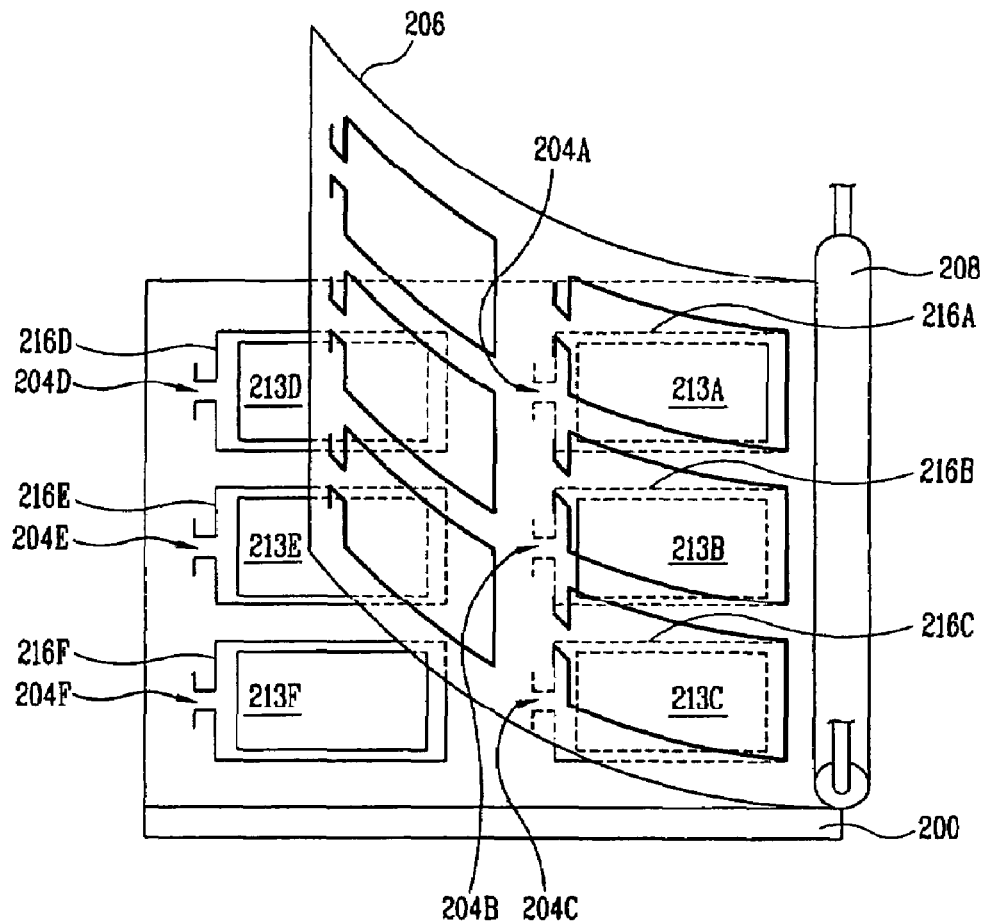
FIGS. 2A and 2B are exemplary diagrams illustrating a related art screen printing method for forming seal patterns.
Figure 2B:
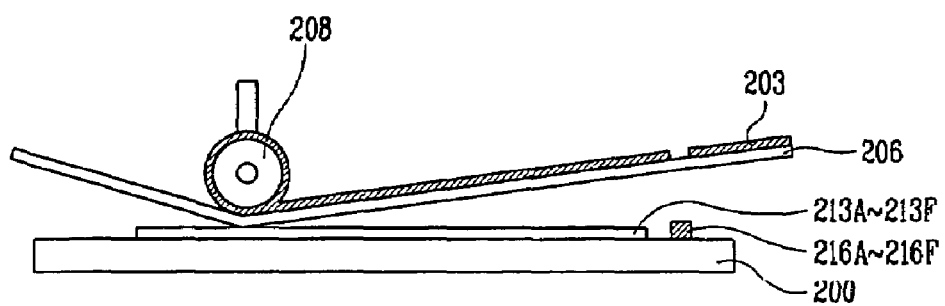
Figure 3:
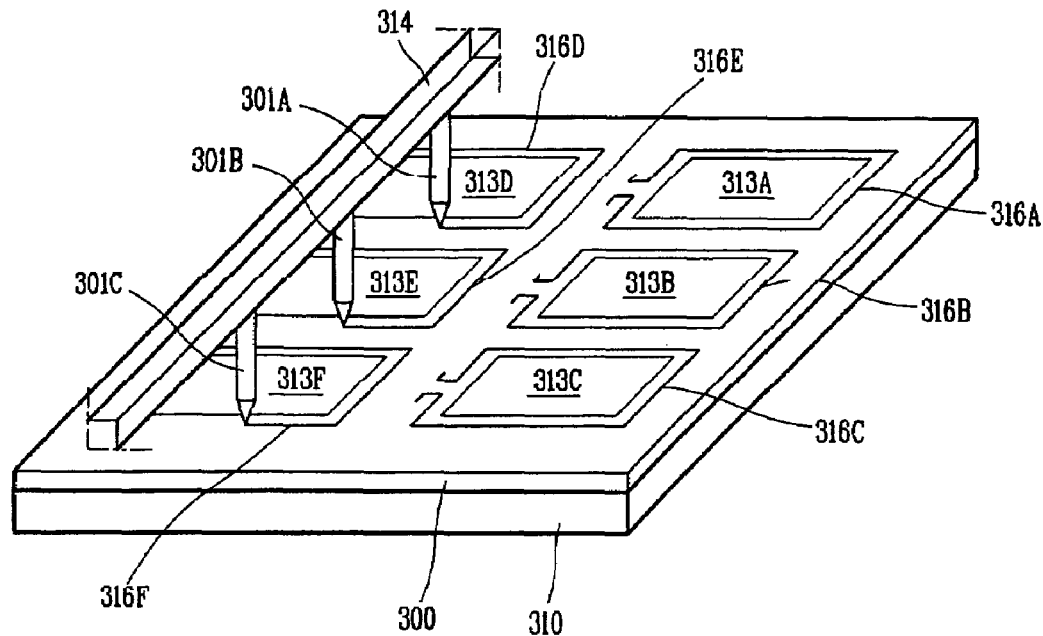
FIG. 3 is an exemplary diagram illustrating a related art seal dispensing method for forming seal patterns.
Figure 4:
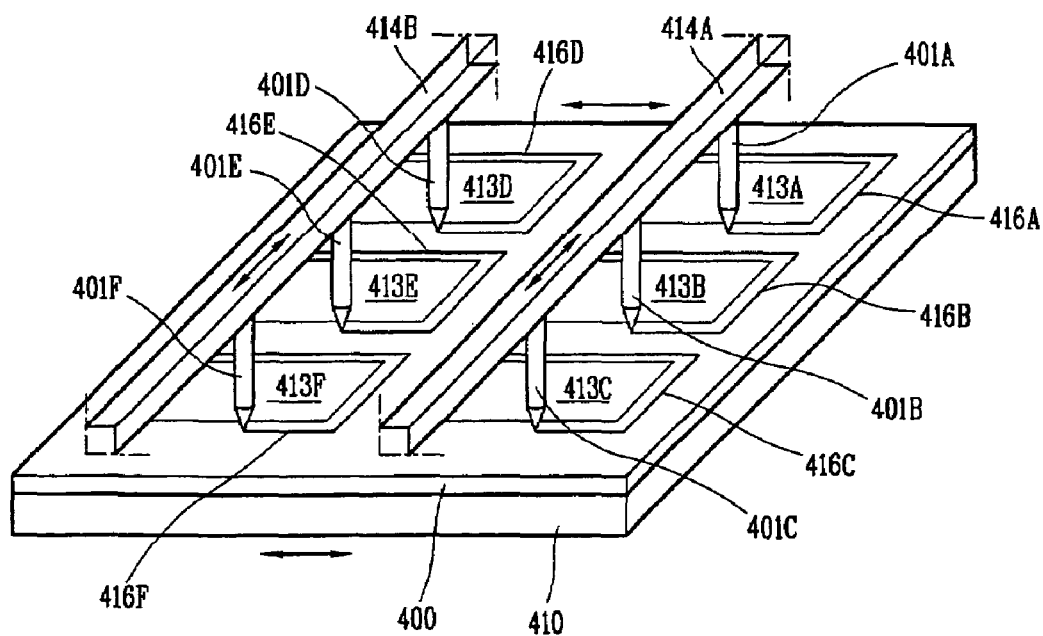
FIG. 4 is a diagram illustrating a dispenser for an LCD panel in accordance with an exemplary embodiment of the present invention.

FIG. 4 is a diagram illustrating a dispenser for an LCD panel in accordance with an exemplary embodiment of the present invention. Referring to FIG. 4, the dispenser for the LCD panel includes a substrate 400 on which image display units 413A-413F are formed, a table 410 on which the substrate 400 is loaded, the table 410 being horizontally driven in the short side direction of the substrate 400, first and second support members 414A and 414B horizontally driven in the long side direction of the substrate 400, and syringes 401A-401F fixedly aligned on the first and second support members 414A and 414B three by three, for forming seal patterns 416A-416F at the peripheral regions of the image display units 413A-413F by supplying a sealant to the substrate 400 via nozzles formed at ends of the syringes 401A-401F.

Herein, the substrate 400 may be a first mother substrate on which a plurality of thin film transistor array substrates are formed, or a second mother substrate on which a plurality of color filter substrates are formed. Also, the substrate 400 is loaded on the table 410, and the table 410 is horizontally driven in the short side direction of the substrate 400. The syringes 401A-401F fixedly aligned on the first and second support members 414A and 414B form the long sides of the seal patterns 416A-416F at the peripheral regions of the image display units 413A-413F by supplying the sealant to the substrate 400 via the nozzles formed at ends of the syringes 401A-401F Moreover, the first and second support members 414A and 414B on which the syringes 401A-401F are fixedly aligned are horizontally driven in the long side direction of the substrate 400. The syringes 401A-401F fixedly aligned on the first and second support members 414A and 414B form the short sides of the seal patterns 416A-416F at the peripheral regions of the image display units 413A-413F by supplying the sealant to the substrate 400 via the nozzles formed at ends of the syringes 401A-401F.

The table 410 may be horizontally driven in the long side direction of the substrate 400. Herein, the syringes 401A-401F fixedly aligned on the first and second support members 414A and 414B form the short sides of the seal patterns 416A-416F at the peripheral regions of the image display units 413A-413F by supplying the sealant to the substrate 400 via the nozzles formed at ends of the syringes 401A-401F.

The first and second support members 414A and 414B may be horizontally driven in the short side direction of the substrate 400. Herein, the syringes 401A-401F fixedly aligned on the first and second support members 414A and 414B form the long sides of the seal patterns 416A-416F at the peripheral regions of the image display units 413A-413F by supplying the sealant to the substrate 400 via the nozzles formed at ends of the syringes 401A-401F.

On the other hand, although the syringes 401A-401F fixedly aligned on the first and second support members 414A and 414B three by three are positioned to correspond to the whole regions of the image display units 413A-413F formed on the substrate 400 in FIG. 4, three syringes may be fixedly aligned on one support member to correspond to one column of the image display units 413A-413F formed on the substrate 400.

As an alternative to FIG. 4, when the image display units 413A-413F formed on the substrate 400 have a matrix of M rows×N columns, M×N syringes 401A-401M×N may be fixedly aligned on a plurality of support members two by two or in a multiple number to correspond to the whole regions of the image display units 413A-413M×N. Moreover, the M×N syringes 401A-401M×N may be fixedly aligned on the plurality of support members in a multiple number to correspond to one or more rows or one or more columns of the image display units 413A-413M×N. In addition, the plurality of support members on which the syringes 401A-401M×N are fixedly aligned in a multiple number to correspond to the whole regions of the image display units 413A-413M×N formed on the substrate 400 may be simultaneously or individually driven.

The dispensing method using the dispenser for the LCD panel in accordance with an exemplary embodiment of the present invention will now be described with reference to FIGS. 5A-5D. FIGS. 5A-5D are diagrams illustrating a dispensing method using the dispenser for the LCD panel in accordance with another exemplary embodiment of the present invention.

Figure 5A:
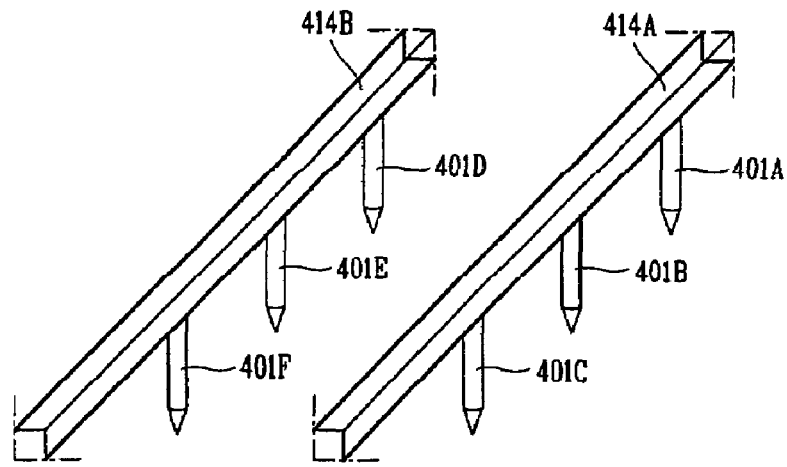
FIGS. 5A-5D are diagrams illustrating a dispensing method using the dispenser for the LCD panel in accordance with another exemplary embodiment of the present invention.

As shown in FIG. 5A, the syringes 401A-401F filled with the sealant are fixedly aligned on the first and second support members 414A and 414B three by three. Herein, the nozzles for discharging the sealant are disposed at ends of the syringes 401A-401F.

Figure 5B:
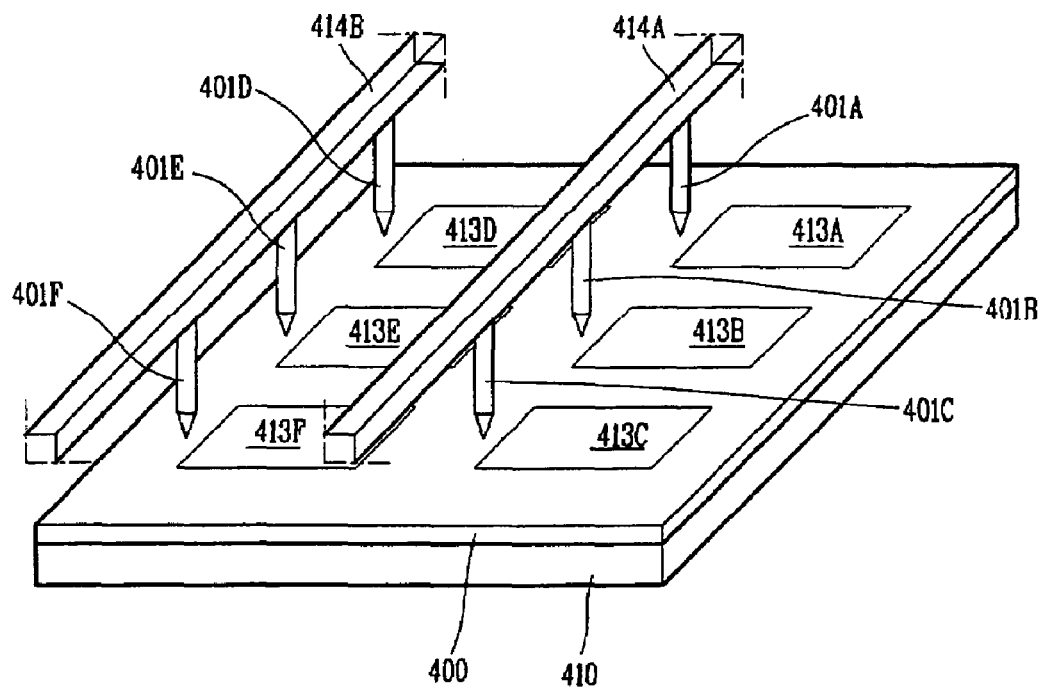

As shown in FIG. 5B, the substrate 400 on which 3 rows×2 columns image display units 413A-413F are formed is loaded on the table 410 to be positioned below the first and second support members 414A and 414B on which the syringes 401A-401F are fixedly aligned three by three.

Figure 5C:
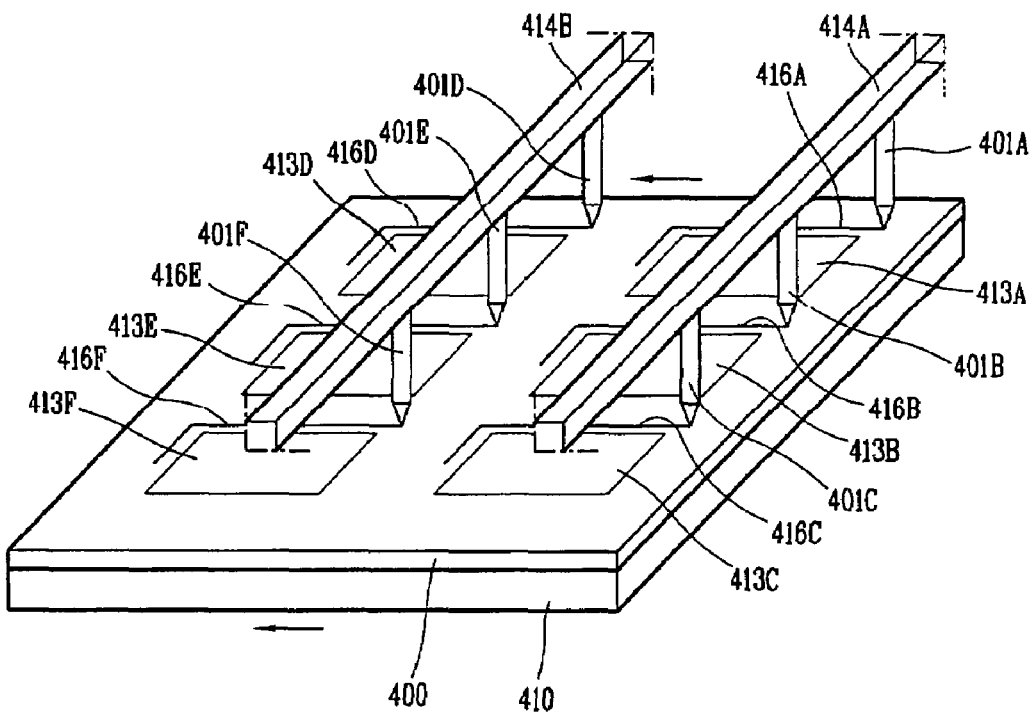

As shown in FIG. 5C, the long sides of the seal patterns 416A-416F are formed at the peripheral regions of the image display units 413A-413F, by horizontally driving the table 410 in the short side direction of the substrate 400, and discharging the sealant to the substrate 400 via the nozzles of the syringes 401A-401F.

Figure 5D:
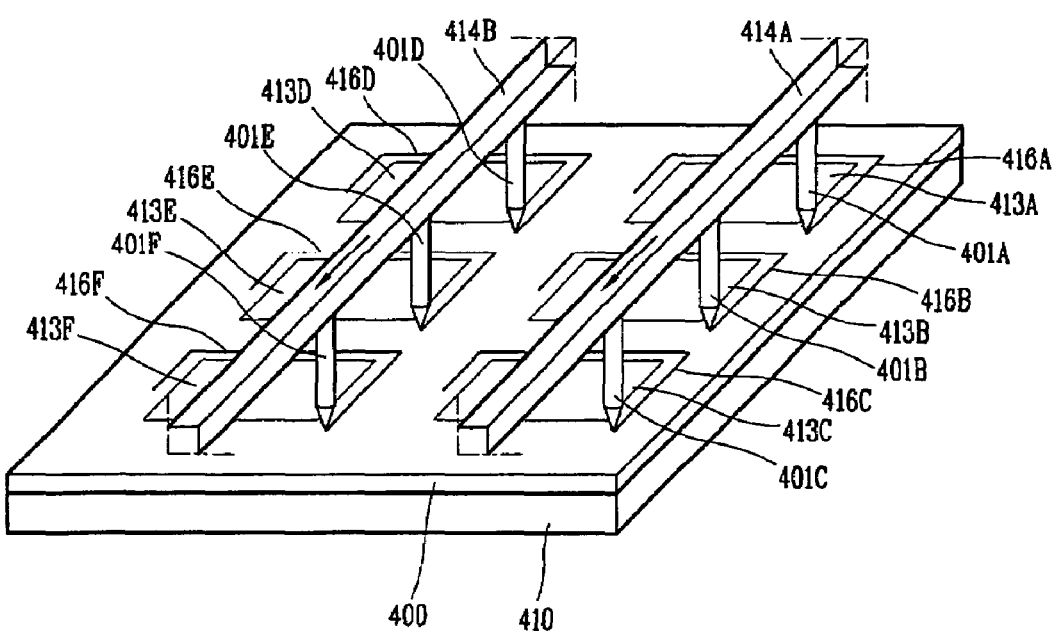

As shown in FIG. 5D, the short sides of the seal patterns 416A-416F are formed at the peripheral regions of the image display units 413A-413F, by horizontally driving the first and second support members 414A and 414B in the long side direction of the substrate 400, and discharging the sealant to the substrate 400 via the nozzles of the syringes 401A to 401F.

Although FIGS. 5C and 5D show formation of one long side and one short side of each of the seal patterns 416A-416F, each of the seal patterns 416A-416F includes two long sides and two short sides. Therefore, still referring to FIG. 5D, after one short side of each of the seal patterns 416A-416F is formed as describe above, the other long side of each of the seal patterns 416A-416F is formed by horizontally driving the table 410 to the original position. After the other long side of each of the seal patterns 416A-416F is formed by horizontally driving the table 410 to the original position, the other short side of each of the seal patterns 416A-416F is formed by horizontally driving the first and second support members 414A and 414B to the original positions.

When the short sides of the seal patterns 416A-416F are formed at the peripheral regions of the image display units 413A-413F by horizontally driving the first and second support members 414A and 414B in the long side direction of the substrate 400, alien substances may be adsorbed onto the image display units 413A-413F of the substrate 400. Accordingly, covers are disposed on the first and second support members 414A and 414B on which the syringes 401A-401F are fixedly aligned to expose only the nozzles disposed at the ends of the syringes 401A-401F to discharge the sealant to the substrate 400.

In accordance with an exemplary embodiment of the present invention, the dispenser for the LCD panel forms the long sides of the seal patterns 416A-416F at the peripheral regions of the image display units 413A-413F by horizontally driving the table 410 in the short side direction of the substrate 400 and supplying the sealant to the substrate 400 via the nozzles. Also, the dispenser for LCD panel forms the short sides of the seal patterns 416A-416F at the peripheral regions of the image display units 413A-413F by horizontally driving the first and second support members 414A and 414B in the long side direction of the substrate 400 and supplying the sealant to the substrate 400 via the nozzles. Herein, the first and second support members 414A and 414B are driven inside the region of the substrate 400 to form the short sides of the seal patterns 416A-416F. Thus, even if a size of the substrate 400 increases, a driving space of the dispenser in a clean-room exists in the region of the substrate 400 in the long side direction of the substrate 400, thereby improving clean-room using efficiency. Further, since the dispenser for the LCD panel forms the short sides of the seal patterns 416A-416F at the peripheral regions of the image display units 413A-413F by horizontally driving the first and second support members 414A and 414B in the long side direction of the substrate 400, a time taken to form the seal patterns 416A-416F is much shorter than that in the method for driving the table 410.

In the dispenser for the LCD panel and the dispensing method using the same, a number of the support members and a number of the syringes fixedly aligned on the support members correspond to a number of the image display units formed on the substrate. Accordingly, in spite of increase in the number of the image display units, the seal patterns can be rapidly formed to improve productivity. In contrast, in the related art, when the small-sized LCD panels is fabricated, the seal patterns cannot be formed at the peripheral edges of the image display units due to interferences between the neighboring syringes. However, in accordance with another exemplary embodiment of the present invention, the dispenser for the LCD panel can form the seal patterns at the peripheral regions of the image display units of the small-sized LCD panels.

FIGS. 6A-6F are diagrams illustrating process for forming the seal patterns at the peripheral regions of the image display units of the small-sized LCD panels by employing the dispenser for the LCD panel in accordance with an exemplary embodiment of the present invention.

Figure 6A:
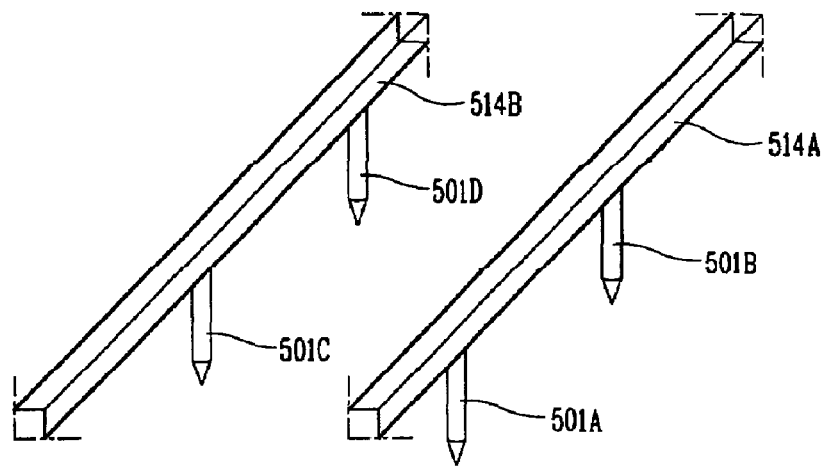
FIGS. 6A-6F are diagrams illustrating a process for forming seal patterns at peripheral regions of image display units of small-sized LCD panels in FIG. 4 in accordance with another exemplary embodiment of the present invention.

Referring to FIG. 6A, syringes 501A-501D filled with a sealant are fixedly aligned on first and second support members 514A and 514B two by two. Nozzles for discharging the sealant are disposed at ends of the syringes 501A-501D. The syringes 501A and 501B fixedly aligned on the first support member 514A are aligned to correspond to odd numbered image display units 513A and 513C among 4 rows×1 column image display units 513A-513D, and the syringes 501C and 501D fixedly aligned on the second support member 514B are aligned to correspond to even numbered image display units 513B and 513D among the 4 rows×1 column image display units 513A-513D.

Figure 6B:
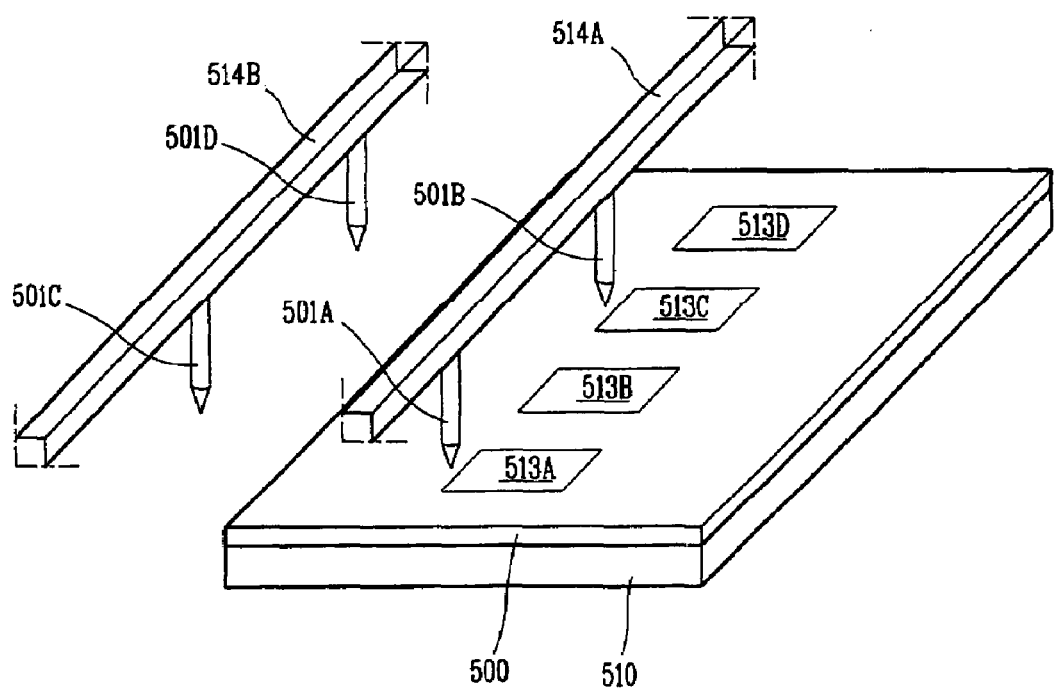

As shown in FIG. 6B, a substrate 500 on which the 4 rows×1 column image display units 513A-513D are formed is loaded on a table 510 to be positioned below the first and second support members 514A and 514B on which the syringes 501A-501D are fixedly aligned two by two.

Figure 6C:
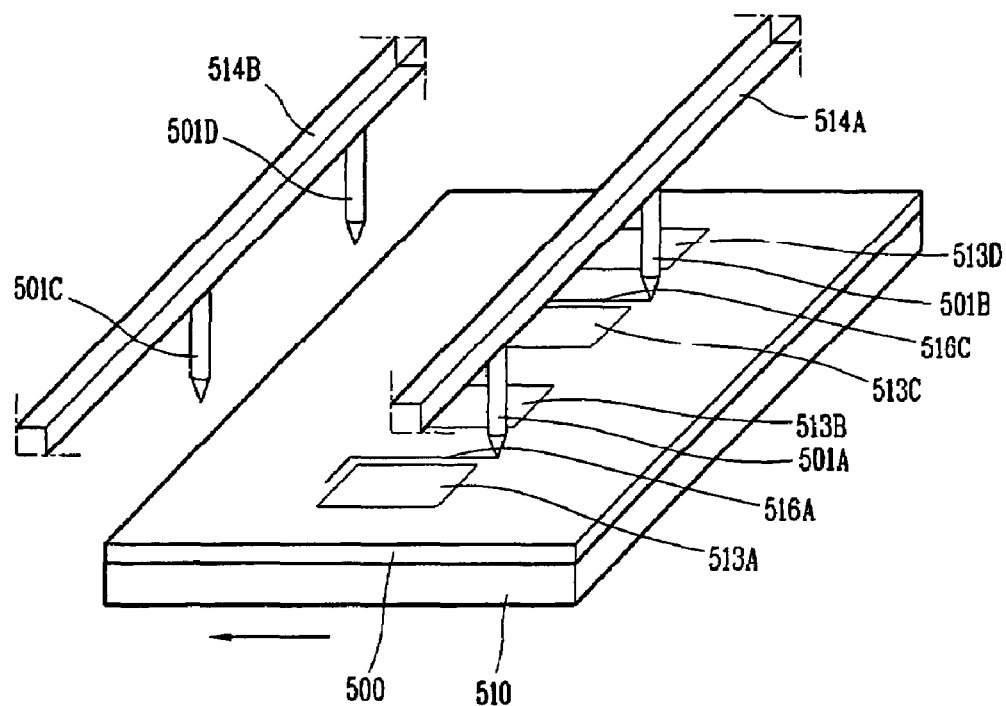

As shown in FIG. 6C, long sides of seal patterns 516A and 516C are formed at the peripheral regions of the odd numbered image display units 513A and 513C by horizontally driving the table 510 in the short side direction of the substrate 500 and discharging the sealant to the substrate 500 via the nozzles of the syringes 501A and 501B.

Figure 6D:
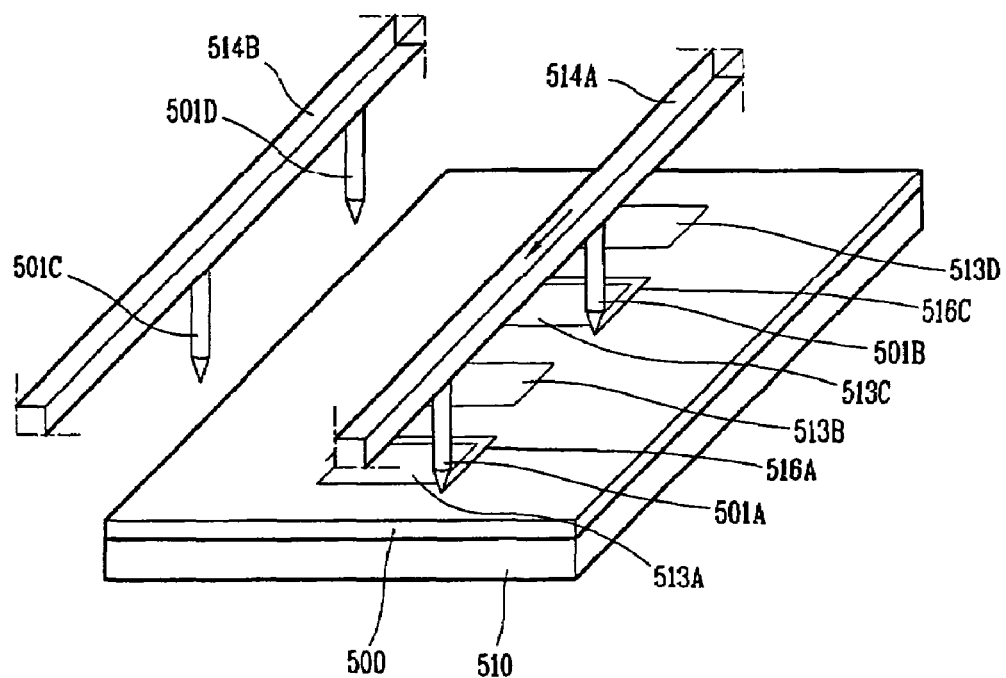

As shown in FIG. 6D, the short sides of the seal patterns 516A and 516C are formed at the peripheral regions of the odd numbered image display units 513A and 513C by horizontally driving the first support member 514A and discharging the sealant to the substrate 500 via the nozzles of the syringes 501A and 501B.

Although FIGS. 6C and 6D show formation of one long side and one short side of each of the seal patterns 516A and 516C, each of the seal patterns 516A and 516C includes two long sides and two short sides. Still referring to FIG. 6D, after one short side of each of the seal patterns 516A and 516C is formed, the other long side of each of the seal patterns 516A and 516C is formed by horizontally driving the table 510 to the original position. After the other long side of each of the seal patterns 516A and 516C is formed, the other short side of each of the seal patterns 516A and 516C is formed by horizontally driving the first support member 514A to the original position.

Figure 6E:
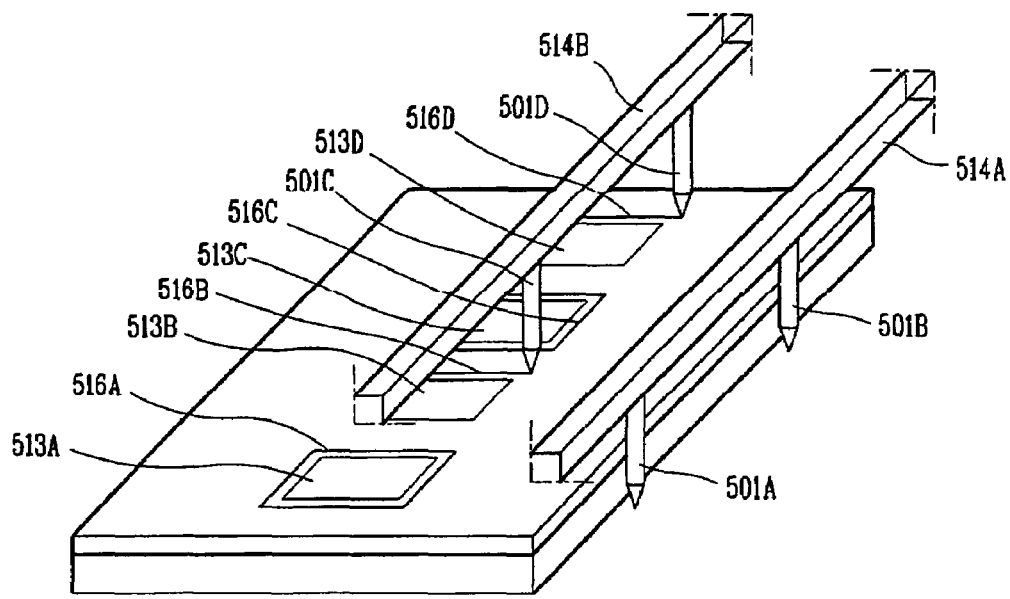

As shown in FIG. 6E, the long sides of the seal patterns 516B and 516D are formed at the peripheral regions of the even numbered image display units 513B and 513D by horizontally driving the table 510 in the short side direction of the substrate 500 and discharging the sealant to the substrate 500 via the nozzles of the syringes 501C and 501D.

Figure 6F:
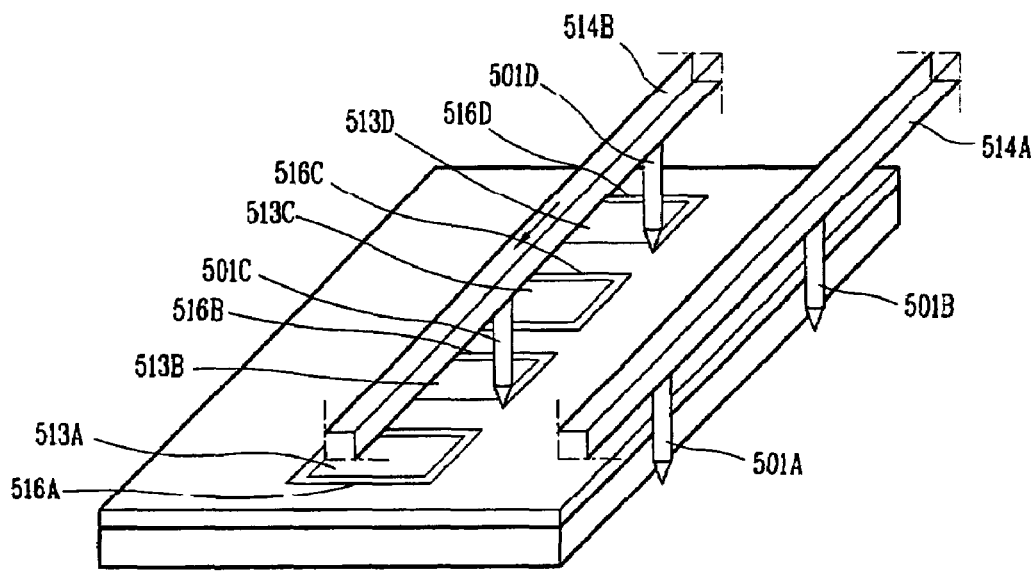

As shown in FIG. 6F, the short sides of the seal patterns 516B and 516D are formed at the peripheral regions of the even numbered image display units 513B and 513D by horizontally driving the second support member 514B in the long side direction of the substrate 500 and discharging the sealant to the substrate 500 via the nozzles of the syringes 501C and 501D.

Although FIGS. 6E and 6F show formation of one long side and one short side of each of the seal patterns 516B and 516D, each of the seal patterns 516B and 516D includes two long sides and two short sides. Still referring to FIG. 6E, after one short side of each of the seal patterns 516B and 516D is formed, the other long side of each of the seal patterns 516B and 516D is formed by horizontally driving the table 510 to the original position. After the other long side of each of the seal patterns 516B and 516D is formed, the other short side of each of the seal patterns 516B and 516D is formed by horizontally driving the second support member 514B to the original position. When the short sides of the seal patterns 516A-516D are formed at the peripheral regions of the image display units 513A-513D by horizontally driving the first and second support members 514A and 514B in the long side direction of the substrate 500, alien substances can be generated and adsorbed to the image display units 513A-513D of the substrate 500. Accordingly, covers are disposed on the first and second support members 514A and 514B to expose only the nozzles of the syringes 501A-501D to discharge the sealant to the substrate 500.

In accordance with an exemplary embodiment of the present invention, the dispenser for the LCD panel and the dispensing method using the same can form seal patterns on small-sized LCD panels. On the other hand, the seal patterns formed by the dispenser for the LCD panel and the dispensing method using the same may be varied in shape according to a method for forming liquid crystal layers on LCD panels. The method for forming the liquid crystal layers on the LCD panels may be classified into a vacuum injection method and a dropping method.

The vacuum injection method puts liquid crystal injection holes of unit LCD panels separated from a large size mother substrate into a liquid crystal-filled vessel in a predetermined vacuum level chamber, and changes a vacuum level. Accordingly, a liquid crystal material is injected into the LCD panels due to a difference between inside and outside pressures of the LCD panels. When the liquid crystal material is filled inside the LCD panels, the liquid crystal injection holes are sealed up to form liquid crystal layers of the LCD panels.

In the vacuum injection method, the liquid crystal injection holes are defined as one-side open regions of seal patterns. Therefore, when the liquid crystal layers are formed on the LCD panels according to the vacuum injection method, some of the seal patterns are opened to serve as the liquid crystal injection holes.

The dropping method drops and dispenses a liquid crystal material in image display regions of a large size first mother substrate on which a plurality of thin film transistor array substrates are formed or a large size second mother substrate on which a plurality of color filter substrates are formed, and evenly distributes the liquid crystal material on the whole image display regions by the attaching pressure of the first and second mother substrates, thereby forming liquid crystal layers. That is, when the liquid crystal layers are formed on the LCD panels according to the dropping method, the liquid crystal material is not externally filled but directly dropped on the substrate. Thus, seal patterns are formed as closed patterns surrounding peripheral regions of image display units in order to prevent the liquid crystals from being externally leaked from the image display units.

Unlike the vacuum injection method, the dropping method performs a process for attaching a large size first mother substrate on which a plurality of thin film transistor array substrates are formed and a large size second mother substrate on which a plurality of color filter substrates are formed, and separating unit LCD panels after forming the liquid crystal layers.

In the dropping method, when the seal patterns are formed by using a thermosetting sealant, while the sealant is heated in a succeeding process for attaching the LCD panels, the sealant can be leaked to contaminate the dropped liquid crystal material. Accordingly, in the dropping method, a UV hardening sealant or a mixed sealant of a UV hardening sealant and a thermosetting sealant may be applied to form the seal patterns.

As described above, in accordance with the present invention, the dispenser for the LCD panel and the dispensing method using the same can improve the clean-room using efficiency, by maintaining the driving space of the dispenser in the clean-room within the region of the substrate in the driving direction of the support members, regardless of increase of the area of the substrate. Further, the dispenser for the LCD panel and the dispensing method using the same may also be applied to various models of LCD panels by forming the seal patterns on the small-sized LCD panels without interferences between the syringes fixedly aligned on the support members. Furthermore, the dispenser for the LCD panel and the dispensing method using the same can reduce the time taken to form the seal patterns more than the general method for driving the table, by forming the short sides or long sides of the seal patterns by horizontally driving the support members in the orthogonal direction to the driving direction of the table and discharging the sealant to the substrate via the syringes fixedly aligned on the support members. As a result, productivity of the LCD device is improved.

It will be apparent to those skilled in the art that various modifications and variations can be made in the dispenser for an LCD panel and dispersing method using the same of the present invention without departing from the spirit or scope of the invention. Thus, it is intended that the present invention cover the modifications and variations of this invention provided they come within the scope of the appended claims and their equivalents.

What is claimed is:

1. A dispensing method for a liquid crystal display panel, comprising:
aligning syringes on first and second support members, respectively;
loading a substrate on a table, the substrate having image display units;
supplying a dispensing material to the substrate via the syringes with horizontally driving the table in a driving direction of a short side of the substrate to form first long sides of seal patterns at peripheral regions of the image display units;
supplying the dispensing material to the substrate via the syringes with horizontally driving the first and second support members in a driving direction of a long side of the substrate to form first short sides of the seal patterns at peripheral regions of the image display units, wherein the substrate is fixed;

supplying a dispensing material to the substrate via the syringes with horizontally driving the table to an original position to form second long sides of the seal patterns at peripheral regions of the image display units; and supplying the dispensing material to the substrate via the syringes with horizontally driving the first and second support members to an original position to form second short sides of the seal patterns at peripheral regions of the image display units, wherein the substrate is fixed.

2. The method of claim 1, wherein the dispensing material is a sealant.

3. The method of claim 2, wherein the sealant is one of a UV hardening sealant, and a mixed sealant of a UV hardening sealant and a thermosetting sealant.

4. A dispensing method for a liquid crystal display panel, comprising:

aligning a plurality of syringes on first and second support members, respectively, wherein the plurality of the syringes on the first support members are aligned on following odd numbered image display units, and the plurality of the syringes on the second support members are aligned on following even numbered image units;

loading a substrate, on which a plurality of image display units are formed, on a table, wherein the plurality of image display units includes the odd numbered image display units and the even numbered image display units;

supplying a dispensing material to the substrate via a first group of the syringes of the first support members with horizontally driving the table in a short side direction of the substrate to form first long side regions of odd numbered seal patterns at peripheral regions of the odd numbered image display units;

supplying the dispensing material to the substrate via the first group of syringes of the first support members with horizontally driving the first support members in a long side direction of the substrate to form first short side regions of the odd numbered seal patterns at the peripheral regions of the odd numbered image display units, wherein the substrate is fixed;

supplying a dispensing material to the substrate via the syringes of the first support members with horizontally driving the table to an original position to form second long side regions of the odd numbered seal patterns at peripheral regions of the odd numbered image display units;

supplying the dispensing material to the substrate via the syringes of the first support members with horizontally driving the first support members to an original position to form second short side regions of the odd numbered seal patterns at peripheral regions of the odd numbered image display units, wherein the substrate is fixed;

supplying the dispensing material to the substrate via a second group of syringes of the second support members with horizontally driving the table in a short side direction of the substrate to form first long side regions of even numbered seal patterns at peripheral regions of the even numbered image display units;

supplying the dispensing material to the substrate via the second group of syringes of the second support members with horizontally driving the second support members in a long side direction of the substrate to form first short regions of the even numbered seal patterns at the peripheral regions of the even numbered image display units, wherein the substrate is fixed;

supplying a dispensing material to the substrate via the syringes of the second support members with horizontally driving the table to an original position to form second long side regions of the even numbered seal patterns at peripheral regions of the even numbered image display units; and supplying the dispensing material to the substrate via the syringes of the second support members with horizontally driving the first support members to an original position to form second short side regions of the even numbered seal patterns at peripheral regions of the even numbered image display units, wherein the substrate is fixed.

5. The method of claim 4, wherein the seal patterns are formed by using one of a UV hardening sealant, and a mixed sealant of a UV hardening sealant and a thermosetting sealant.

* * * * *